United States Patent
Bordunov et al.

(10) Patent No.: US 7,147,891 B2
(45) Date of Patent: Dec. 12, 2006

(54) POLYMER SUBSTRATE COATED WITH WEAK CATIONIC-EXCHANGE FUNCTIONAL LAYER

(75) Inventors: Andrei V. Bordunov, Campbell, CA (US); Maria Rey, San Jose, CA (US); Christopher A. Pohl, Union City, CA (US)

(73) Assignee: Dionex Corporation, Sunnyvale, CA (US)

( * ) Notice: Subject to any disclaimer, the term of this patent is extended or adjusted under 35 U.S.C. 154(b) by 190 days.

(21) Appl. No.: 10/778,007

(22) Filed: Feb. 11, 2004

(65) Prior Publication Data

US 2005/0175851 A1    Aug. 11, 2005

(51) Int. Cl.
   *C08J 3/24* (2006.01)

(52) U.S. Cl. .................. 427/212; 210/506; 521/27; 521/38

(58) Field of Classification Search .............. 521/27, 521/38; 427/212; 210/263, 506
See application file for complete search history.

(56) References Cited

U.S. PATENT DOCUMENTS

| | | | |
|---|---|---|---|
| 3,945,927 A * | 3/1976 | Imai et al. ............. | 210/500.37 |
| 4,705,636 A * | 11/1987 | Small et al. ............ | 210/638 |
| 5,182,016 A * | 1/1993 | Funkenbusch et al. ... | 210/198.2 |
| 5,503,933 A | 4/1996 | Afeyan et al. | |
| 5,645,717 A * | 7/1997 | Hjerten et al. .......... | 210/198.2 |
| 5,792,331 A | 8/1998 | Srinivasan et al. | |
| 5,968,363 A | 10/1999 | Riviello et al. | |
| 6,074,541 A | 6/2000 | Srinivasan et al. | |
| 6,569,910 B1 * | 5/2003 | Spindler et al. ............ | 521/30 |
| 6,586,097 B1 * | 7/2003 | Pascault et al. ............ | 428/402 |
| 6,758,967 B1 * | 7/2004 | Anderson et al. ........ | 210/198.2 |

FOREIGN PATENT DOCUMENTS

WO    WO 2004/024325 A1    3/2004

OTHER PUBLICATIONS

Farrall, M. et al., "Bromination and Lithiation: Two Important Steps in the Functionalization of Polystyrene Resins," *J. Org. Chem*, 41(24), 3877-3882, (Jun. 1976).

Yang, R. et al., "Maleic acid- styrene encapsulated silica cation exchanger in high performance liquid chromatography," *Talanta*, 55, 1091-1096, (2001).

Kolla, P. et al., "Polymer-Coated Cation-Exchange Stationary Phases on Basis of Silica," *Chromatographica*, 23(7), 465-472, (Jul. 1987).

Nair, L. et al., "Simultaneous separation of alkali and alkaline-earth cations on polybutadiene-maleic acid-coated stationary phase by mineral acid eluents," *J. Chromatography*, 640, 41-48, (1993).

* cited by examiner

*Primary Examiner*—H. Thi Le
(74) *Attorney, Agent, or Firm*—Dorsey & Whitney; David J. Brezner

(57) ABSTRACT

A method for making a weak cation-exchange (carboxylic acid) medium comprising contacting a solution of a functional organic polymer having carbon to carbon double bond unsaturation and having weak cationic exchange functional moieties or precursors thereof in a solvent with a substrate having an organic polymer surface, evaporating said solvent and breaking said double bond under conditions to cause the functional organic polymer to covalently bond to the substrate surface and to cross-link to form a cross-linked functional polymer layer covalently bound to the substrate surface. The medium produced by the method.

11 Claims, 3 Drawing Sheets

POLYMER SUBSTRATE COATED WITH WEAK CATIONIC-EXCHANGE FUNCTIONAL LAYER

BACKGROUND OF THE INVENTION

The present invention relates to weak cationic-exchange chromatographic supports. Such supports are known to provide short retention times and high efficiencies with diluted mobile phases of moderate ionic strength. This permits low detection limits. Selectivity characteristics of such materials are different from those demonstrated by strong cation-exchangers permitting certain chromatographic applications not suited for highly retentive cation-exchange phases such as sulfonated styrene-based polymers. One approach for the synthesis of weak cation-exchange materials is by direct funtionalization of a stationary phase by chemical transformation of the functional groups on a surface of the solid support. Farrall, et al., *J. Org. Chem*, 41, 24 (1976), 3877–3882 [Reference 1].

Another approach is by grafting or growing polymeric chains from the surface of a substrate in which weak cation-exchange sites are part of a monomeric structure. Yang, et al., *Talanta* 55 (2001), 1091–1096; Srinivasan et al., U.S. Pat. No. 5,792,331 (1998); Riviello et al., U.S. Pat. No. 5,968,363 (1999) [References 2–4]. A further approach is by coating the particles of a stationary phase with a pre-made polymer containing weak cation-exchange sites such as carboxylic groups. Kolla, et al., *Chromatographia*, 23, 7 (1987), 465–472; Nair, et al., *J. Chromatography*, 640 (1993), 41–48 [References 5–6]. This latter method of coating with a polymeric film permits efficient coverage of the particles and thus reduces secondary interactions between analytes and unfunctionalized regions on the surface. Also, the coating technique is a convenient way of controlling the film thickness. The substrates disclosed for the stationary phases to be coated are inorganic support materials, specifically microparticulate silica. The specific coating material is a copolymer such as poly(butadiene-maleic acid) termed "PBDMA." The polymer in solution penetrates the silica pores and coats them. Hydrophilic instability of silica gel can cause leaching of the silicates on the substrate media in spite of the surface shield provided by a cross-linked polymeric film leading to interference with detection of the analytes. Also, the silica base supports can contaminate a suppressor membrane due to the leaching silicates.

It is an object of the invention to provide a weak cation-exchange medium with a coating of weak cation-exchange functional groups without the disadvantages of prior art stationary phases.

SUMMARY OF THE INVENTION

In accordance with one embodiment of the present invention, a method is provided for making a weak cation-exchange medium comprising contacting a solution of a functional organic polymer having carbon to carbon double bond unsaturation and having weak cationic exchange functional moieties or precursors thereof in a solvent with at least one substrate having an organic polymer surface, evaporating said solvent and breaking said double bond under conditions to cause said functional organic polymer to covalently bond to said substrate surface and to cross-link to form a cross-linked functional polymer layer covalently bound to the substrate surface.

In another embodiment of the invention, a coated weak cation-exchange medium is provided comprising a functional organic polymer having weak cation-exchange functional moieties or precursors thereof covalently bound in a cross-linked layer to an organic polymer surface of a substrate.

DETAILED DESCRIPTION OF THE PREFERRED EMBODIMENTS

Figure 1:
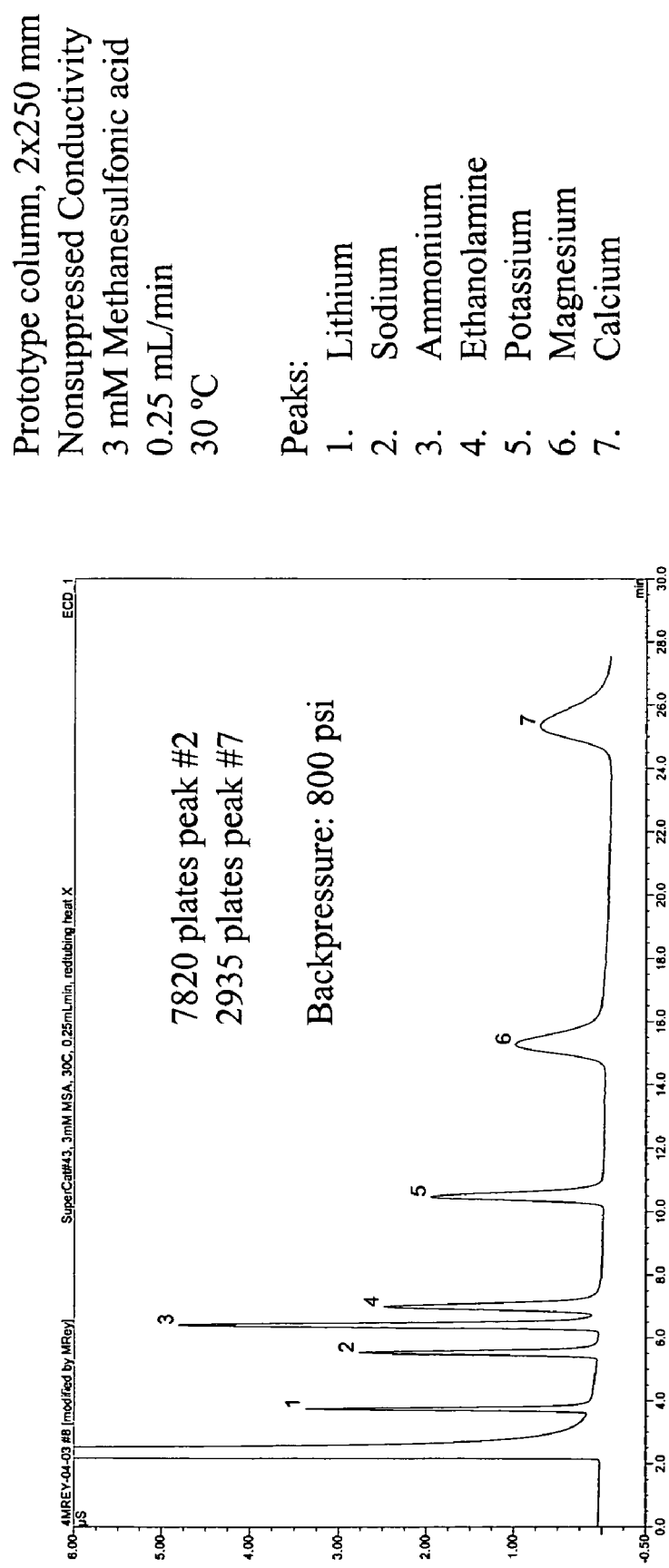
FIGS. 1–3 are chromatograms illustrating use of the weak cation-exchange medium in chromatographic separations.

In general terms, the weak cation-exchange medium of the present invention is made by forming a polymer solution of a coating weak cation-exchange functional polymer, typically a linear polymer, and then bonding it to an organic polymer substrate while simultaneously cross-linking the functional polymer layer.

The coating polymer first will be described. It is a functional preformed organic polymer having carbon-to-carbon unsaturation and also having weak cation-exchange functional moieties or precursors. This coating polymer will be referred to herein alternatively as the "functional organic polymer" or "coating polymer." A solution of the coating polymer is contacted with a substrate having an organic polymer surface.

In a preferred embodiment, the substrate comprises particles or beads made from an organic polymer in which the coated particles are suitable for use as packing in a chromatographic column. The invention will be described first with respect to this embodiment. The coating polymer is dissolved in a solvent and is mixed with the substrate particles. Then, the solvent is evaporated and the double bonds in the coating polymer are broken under an elevated temperature in the presence of a free radical initiator to cause the functional polymer to covalently bond to the substrate surface and to cross-link on the substrate surface to form a cross-linked functional polymer layer covalently bound to the substrate surface. Evaporation and the breaking of the double bonds may occur simultaneously. However, it is preferred to evaporate a solvent before breaking the double bonds because of the difference in temperatures which are normally required for evaporation of the solvent and breaking the double bonds upon cross-linking and bonding to the substrate surface.

Any of a variety of weak cation-exchange functional moieties may be employed. Preferably, such moieties are acids or their precursors (e.g., esters and anhydrides).

The weak cation-exchange functional groups can be a variety of weak acidic moieties, or precursors of such groups, e.g., their esters and anhydrides. Preferably, such weak acidic groups are substituted and unsubstituted "carboxylic acids" which are defined to include monocarboxylic, dicarboxylic and poly carboxylic acids. As used herein, the term "weak cation-exchange functional moiety" and "weak cation-exchange medium" and variance of these terms means that the moiety is characterized by pKa>1.5.

The functional polymer also includes unsaturation through carbon-to-carbon double bonds. A preferred functional polymer includes a —(C═C)— double bond unsaturation in the polymer chain at the time of coating. The double bonds are broken during the coating process. The activated carbon sites created by breaking the double bond form covalent bonds with the organic polymer substrate surface and also cross-link within the coating layer to form a cross-linked polymer layer covalently bounded to the substrate surface.

In a preferred embodiment, the functional polymer is a copolymer of a diene, such as butadiene, with a weak acid (e.g., maleic acid) or precursor (e.g., maleic anhydride). A method of coating the copolymer (PBDMA) is described for use in coating inorganic silica substrates in Reference [5]. As used herein, the term PBDMA may include a succinic acid moiety, (the saturated form) which is formed upon polymerization of the maleic acid and butadiene. Suitably, the succinic acid moiety can be derived from the succinic anhydride groups in the polymer which are hydrolyzed after formation of the polymer before or after coating. Thus, the term PBDMA can include such succinic acid and/or succinic anhydride moieties as well as maleic acid and/or maleic anhydride moieties. A commercially available source of the PBDMA is available from Polysciences Inc.

The coating technique described in Reference [5] can be used herein with the exception that the covalent bonding in the present invention is performed on an organic polymer surface of the substrate rather than on the inorganic silica based-surface of the prior art. In one embodiment, such method includes dissolving the PBDMA prepolymer in a suitable solvent such as acetone mixed with an initiator such as dicumylperoxide. Then, the support particle substrates are suspended in this solution. The double bonds typically are broken as by free radical initiation after the solvent is evaporated to form the coated particles which can be used for weak cation-exchange for chromatography or other ion exchange applications.

If the substrate is porous, the functional polymer is present in the solution at a low enough concentration to permit the polymer to penetrate the pores of the substrate surface to preferably provide a continuous uniform layer. The elevated temperature and/or low vacuum causes the solvent to evaporate. Preferably, the solvent is characterized by b.p., 80° C. Suitable concentrations of the polymer in solution are from 5% to 80%. Suitable solvents include acetone, THF, acetonitrile and ether.

In one preferred embodiment, the coating functional organic polymer includes repeating units of the following structural formula

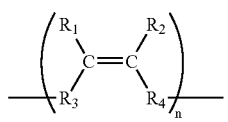

(1)

wherein $R_1$ and $R_2$ groups are independently a proton, alkyl, alkenyl, allyl, cycloalkyl, cycloalkenyl, aromatic, heteroaromatic, cyano or halogen substituents; $R_3$ and $R_4$ groups (part of the polymer chain) are independently alkyl, alkenyl, allyl, cycloalkyl, cycloalkenyl, aromatic or heteroaromatic substituents; $R_1$, $R_2$, $R_3$, and $R_4$ groups optionally including other double bonds, expoxy rings, amino groups, alkyl halides, hydroxy groups, oxygen, nitrogen, sulfur and phosphorous heteroatoms substitutions; at least one of the $R_1$, $R_2$, $R_3$, and $R_4$ groups comprising a weak cation functional group such as carboxylic acid moieties, or precursors thereof. (The structural formula $—(R_1R_3C{=}C\ R_2R_4)_n—$ is used herein as a shorthand version of formula (1).)

As set forth above, the term carboxylic acid moieties include monocarboxylic acid, dicarboxylic and polycarboxylic acid moieties. Suitable carboxylic acid moieties include acetic, succinic, propionic, valeric, chloroacetic, benzoic and others.

Preferably, the above formula (1) is a copolymer of a 1,3-diene monomer and a monomer which includes such weak cation-exchange moieties such as carboxylic acid or precursors thereof. "Precursor" means an anhydride or other group that is readily converted into such acid groups. Suitable 1,3-diene groups include 1,3-butadiene, isoprene, 1,3-cyclohexadiene, cis-3,5-cyclohexadiene-1,2-diol, 1,3-cycloheptadiene another commercially available or custom-made 1,3-diene monomers. An example of the functional monomers to provide cation-exchange functionality in the copolymer include maleic acid, acrylic acid, methacrylic acid, esters of acrylic and methacrylic acids, and other unsaturated weak acids or their precursors such as anhydrides which can be hydrolyzed to the acid form.

The functional polymer of formula (1) preferably comprises linear polymeric chain prior to covalent bonding with the substrate and cross-linking. Such chain in the polymer (e.g., PBDMA) typically include a molecular weight in the range of 1,000 to 100,000 or preferably 5,000 to 20,000.

The functional organic polymer is covalently bound to a substrate including an organic polymer surface. The term "organic polymer surface" excludes inorganic surfaces such as silica, zirconia or aluminum oxide but can be applied to inorganic supports coated with the organic polymer prior to depositing a weak cation-exchange layer. Any organic polymer with available carbon groups for covalent bonding are suitable for use as the substrate. For use as particulate material for a chromatographic column, the substrate preferably is cross-linked. Further, it is preferably porous. This permits the functional polymer solution to flow into the pores of the substrate surface prior to solvent evaporation and breaking of the double bonds. In this way, the polymer forms a continuous layer on the substrate pore walls to increase the capacity of the substrate particles. Further, it is preferable that the substrate includes residual double bonds such as supplied by excess double bonds in a cross-linking agent which remain unsaturated after cross-linking of the polymeric substrate particles.

Any conventional organic polymers may be used which are employed as substrates for chromatographic packing. See, for example, the list of polymeric substrates in U.S. Pat. No. 6,074,541. Such polymeric materials include vinylbenzene, substitute vinylbenzene, acrylate, methacrylate or other organic polymers. Suitable cross-linking agents includes divinylbenzene (DVB). A preferred substrate is a styrene polymer cross-linked with divinylbenzene a well-known substrate for chromatographic packing. The amount of cross-linking in the substrate of the present invention can vary over a wide range such as 10% to 80%, preferably 50% to 80%.

A preferred form of the substrate or support material is cross-linked polymer particles of conventional size for chromatographic packing, e.g., with a particle diameter of about 0.1–200 microns and more preferably 3 to 10 microns with a pore size ranging from about 100 Å to 3,000 Å and more preferably from 300 Å to 1,000 Å.

Other forms of polymeric substrates may also be employed including the surface of monolithic rods, chips or capillaries in which the cation-exchange polymeric layers are bonded by covalent attachment to the surfaces of the substrates.

Suitable support substrates include the foregoing organic polymer materials as the entire support. However, the invention includes the use of a layer of such organic polymeric substrate on a structural underlying support. As used herein, the term "organic polymer surface" encompasses both a substrate formed entirely of the organic polymer and also a support substrate including an organic polymer layer only on the exposed surface of a support substrate which is made of a different material.

Preferably, the method of covalently binding the functional organic polymer to the substrate includes the well-known techniques for breaking the —C=C— double bond to thereby activate these carbon atoms to permit them to covalently bound with the substrate surface and to cross-link with other linear chains of the functional polymers. This technique results in substantially complete coverage of the exposed particle surfaces including pores to reduce secondary interactions between analytes and unfunctionalized regions on the substrate surface. Also, it is a convenient way of controlling the thickness of the coating. Free radical initiating of such double bonds is well-known as illustrated in Reference [5].

The deposited film is cross-linked and covalently bonded to the substrate surface in the presence of a high temperature radical initiator such as dicumyl peroxide at elevated temperatures (e.g., 100–180° C.) to cross-link the formula (1) fragments with each other and simultaneously form covalent bonds with the surface of the polymeric bead substrates.

In a preferred embodiment, the bonding to the substrate surface is through residual bonds on the surface of the beads, e.g., the double bond in a styrene-DVB bead or through a hydrogen abstraction mechanism.

In contrast to the use of silica substrates, leaching of chemical components such as silicates is not a problem for the polymeric substrates coated with weak cation-exchange medium of the present invention even if a complete surface shield is not provided on the substrate surface. Also, the coated medium of the present invention provides for good ion chromatographic separation for use in a non-suppressed as well as a suppressed detection mode. Ion chromatography is a well-known technique in which after chromatographic separation, the conductivity of the developing agent of the eluent is suppressed prior to detection, typically by a conductivity detector. Silica-based supports will contaminate a suppressor membrane due to the leaching silicates. Therefore, they are recommended for non-suppressed separation which is limited to an isocratic elution. The materials of the present invention can be operated in both suppressed and non-suppressed modes, allowing for isocratic and gradient IC separation.

Further details of the invention are illustrated in the following non-limiting examples.

EXAMPLE 1

Making of the Weak Cation-exchange Medium 11 g of the cross-linked styrene-DVB resin (5.7 μm) mixed with the 11 g of 25% acetone solution of the polybutadiene/maleic anhydride co-polymer, 80 ml of acetone and 1 g of dicumyl peroxide, was sonicated for 15 min. Acetone was evaporated under reduced vacuum using a rotary evaporator. After removing the solvent at 60° C., a coated resin was heated at 160° C. overnight in dry state. A resin sample was washed with acetone and filtered. It was further refluxed with acetone overnight, filtered and refluxed with acetone/water mixture overnight. A sample was filtered again, washed with acetone on the filter and dried on the air. Dry resin has been packed into 2×250 mm PEEK tubing using conventional slurry technique and treatment with sodium hydroxide solution prior to packing.

EXAMPLE 2

In this example, a typical ion-exchange separation process is illustrated using the packed column of Example 1. The analytical equipment used was a model ICS-2000 system of Dionex Corporation. The conditions of the run were shown in FIG. 1. The results are illustrated in the chromatogram of FIG. 1.

EXAMPLE 3

Figure 2:
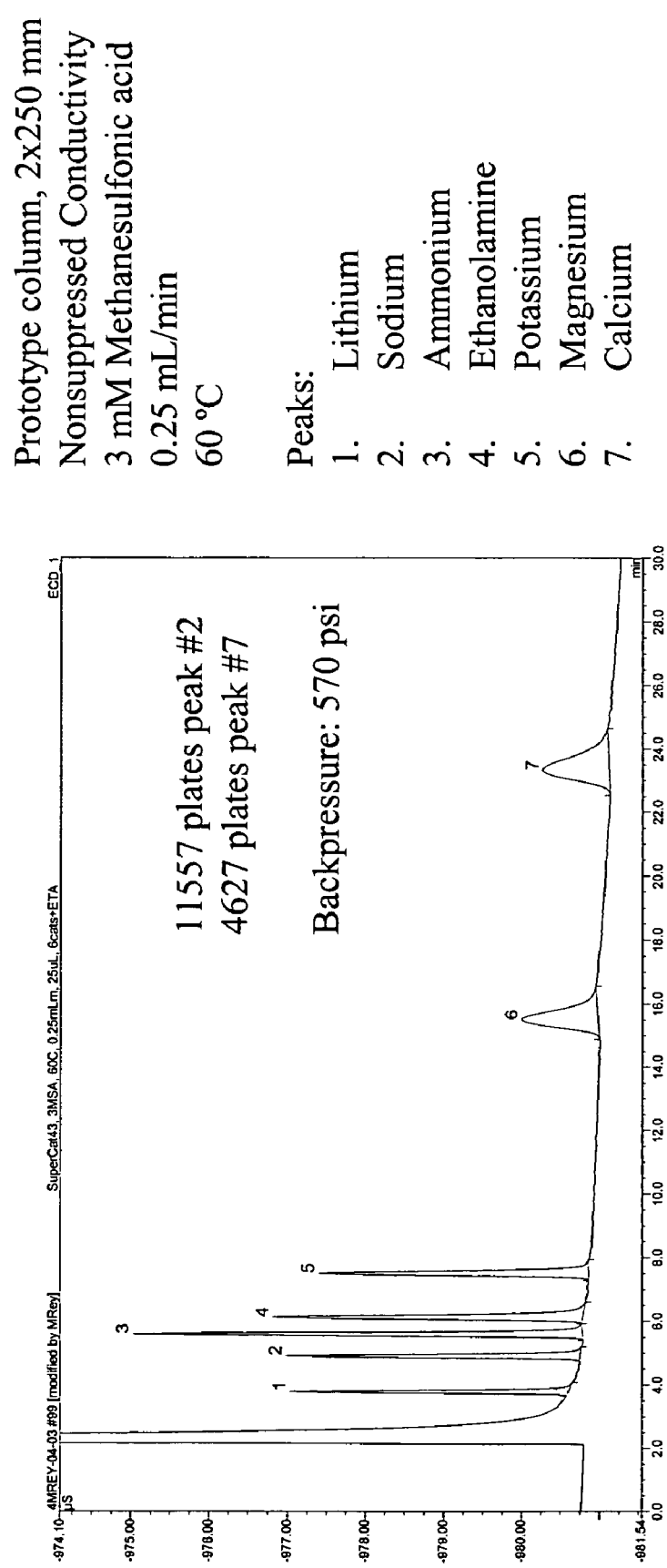

The method of Example 2 was used with the exception that the temperature of separation was 60° C. as compared to 30° C. in Example 2. The peak shapes and efficiencies were substantially improved in this example as illustrated in FIG. 2. In both examples, the hydrolytic stability of the medium permitted consistency of retention times, selectivity and resolution during multiple chromatographic runs.

EXAMPLE 4

Figure 3:
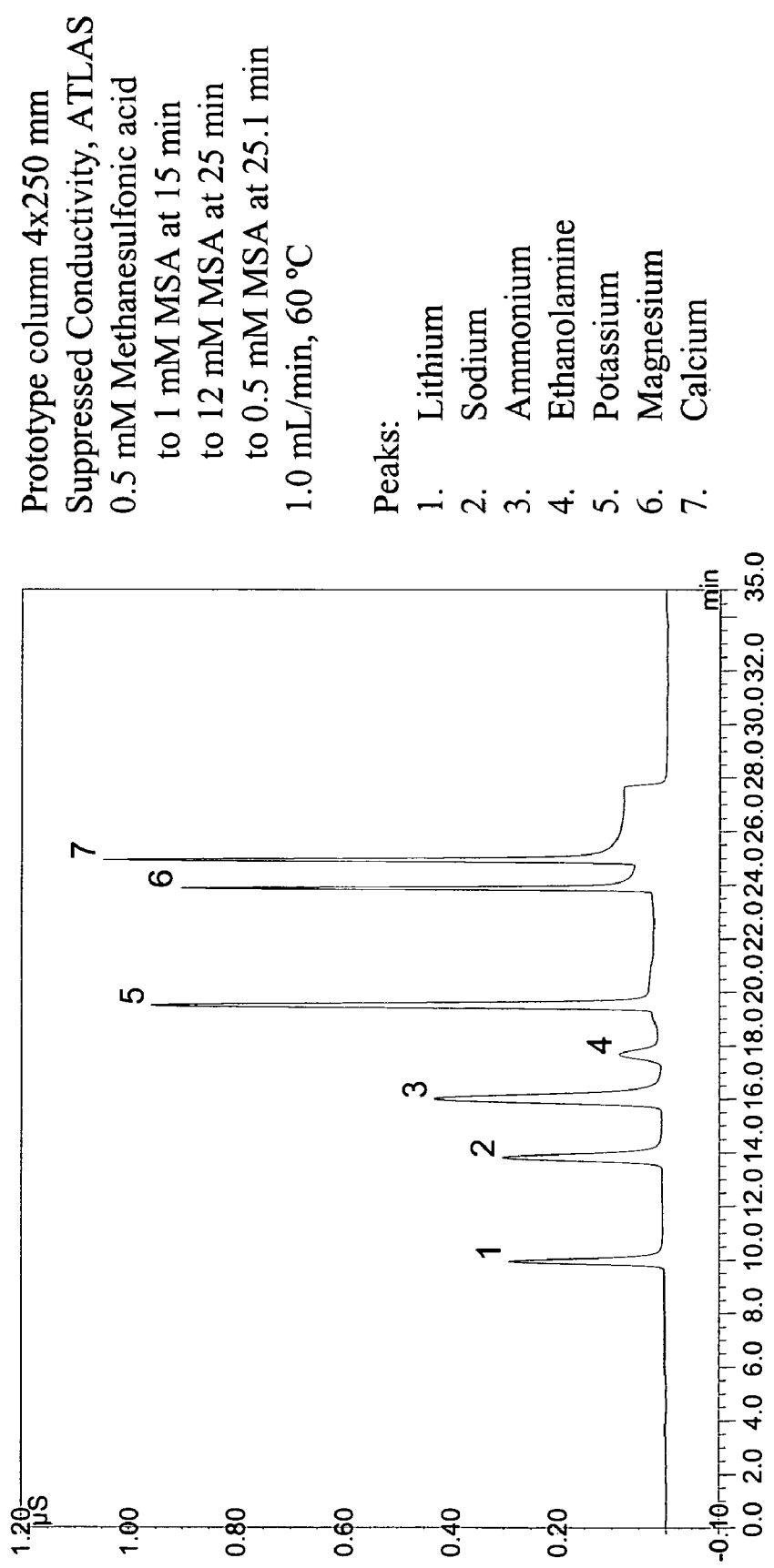

This example illustrates a separation of cations at elevated temperatures using a gradient elution and the analytical system of Example 1 using the conditions of Example 3 except for the use of a gradient eluent as illustrated in FIG. 3. The equipment used was a model DX500 system of Dionex Corporation. FIG. 3 illustrates the advantages of using a gradient elution with a suppressed detector, allowing for greater peak resolution and flexibility of the chromatographic analysis.

What is claimed is:

1. A method of making a weak cation exchange medium comprising contacting a solution of a functional organic polymer having carbon to carbon double bond unsaturation and having weak cationic exchange functional moieties or precursors thereof in a solvent with at least one substrate having an organic polymer surface, removing said solvent from said solution by evaporation and thereafter breaking said double bond in the substantial absence of said evaporated solvent under conditions to cause said functional organic polymer to covalently bond to said substrate surface and to cross-link to form a cross-linked functional polymer layer covalently bound to the substrate surface.

2. The method of claim 1 in which said substrate surface is porous and said functional polymer solution flows into the pores of said substrate surface prior to a solvent evaporation and breaking of said double bond.

3. The method of claim 2 further comprising a plurality of said substrates in the form of particles suitable for use as a weak cation exchange chromatographic medium.

4. The method of claim 3 in which said substrate surface comprises a cross-linked polymer having residual unsaturation and said covalent bonding with said substrate surface is through said residual unsaturation.

5. The method of claim 4 in which said plurality of substrates comprise particles formed of said cross-linked polymer.

6. The method of claim 1 further comprising packing said particles in a chromatographic column.

7. The method of claim 1 in which said weak cation exchange groups comprise carboxylic acid moieties.

8. The method of claim 1 in which said weak cationic exchange moieties comprise succinic acid.

9. The method of claim 1 in which said functional organic polymer comprises a copolymer of butadiene and a weak acid cation exchange moiety or precursor thereof.

10. The method of claim 1 where said functional organic polymer comprises

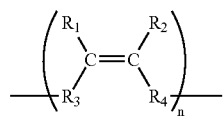

wherein $R_1$ and $R_2$ groups are independently protons and/or alkyl, alkenyl, allyl, cycloalkyl, cycloalkenyl, aromatic, heteroaromatic, cyano or halogen substituents;

$R_3$ and $R_4$ groups are independently alkyl, alkenyl, allyl, cycloalkyl, cycloalkenyl, aromatic or heteroaromatic substituents;

$R_1$, $R_2$, $R_3$, and $R_4$ groups optionally including other double bonds, expoxy rings, amino groups, alkyl halides, hydroxy groups, oxygen, nitrogen, sulfur and phosphorous heteroatoms substitutions;

at least one of the $R_1$, $R_2$, $R_3$, and $R_4$ groups comprising a weak cation functional moiety, or precursor thereof.

11. The method of claim 10 in which said weak cation functional group comprises carboxylic acid.

* * * * *